United States Patent [19]
Hehl et al.

[11] 4,101,009
[45] Jul. 18, 1978

[54] NON REACTIVE POSITIONING DEVICE

[75] Inventors: Walter Hehl, Steinenbronn; Horst Matthaei, Waldenbuch, both of Fed. Rep. of Germany

[73] Assignee: International Business Machines Corporation, Armonk, N.Y.

[21] Appl. No.: 762,700

[22] Filed: Jan. 26, 1977

[30] Foreign Application Priority Data
Jan. 31, 1976 [DE] Fed. Rep. of Germany ....... 2603689

[51] Int. Cl.² .............................................. F16F 13/00
[52] U.S. Cl. ..................................... 188/1 B; 267/137
[58] Field of Search ......................... 188/1 B; 267/137

[56] References Cited
U.S. PATENT DOCUMENTS
3,387,499   6/1968   Bruderlein ..................... 188/1 X Primary Examiner—Duane A. Reger
Attorney, Agent, or Firm—James A. Ruth; Edward S. Drake

[57] ABSTRACT

The vibration forces between a frame and a continuously oscillating mass are absorbed by making the oscillating mass system and its drive means equal and by fitting each such system and means to the frame with identical resilient elements such that oscillation movements of system and means occur out of phase one with the other to absorb the exciting vibration forces.

6 Claims, 6 Drawing Figures

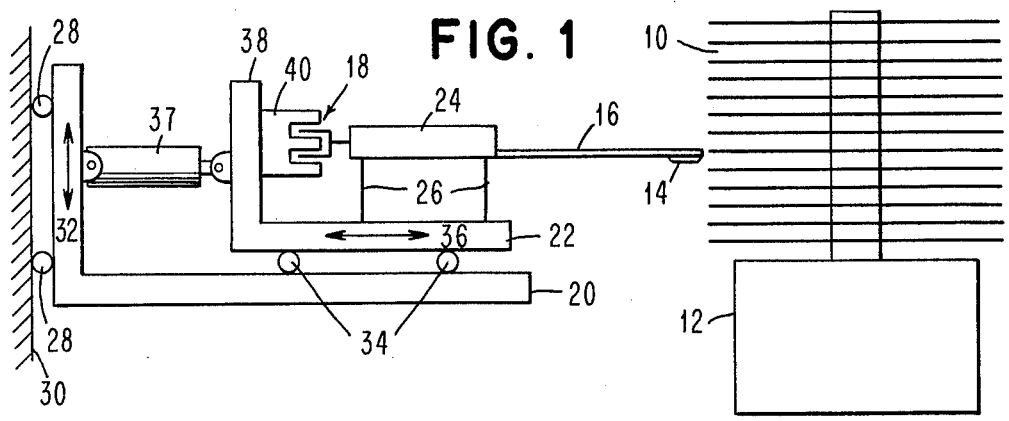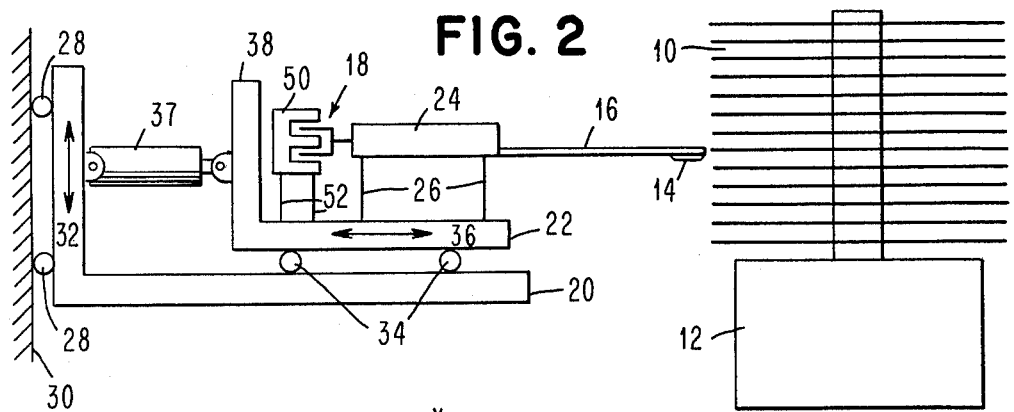

NON REACTIVE POSITIONING DEVICE

BACKGROUND OF THE INVENTION

Field of the Invention

In many machines, devices, and arrangements with oscillating masses measures have to be taken to prevent, or at least keep within very narrow limits, the transfer of oscillations to other components of the machine. Although in the case of periodic oscillations the spring-mass system can be designed in such a manner that the resonance frequencies are as far apart as possible from each other, thereby preventing masses or mass systems capable of oscillating from resonating as a result of the natural frequency of the oscillating mass, such a measure is insufficient to prevent undesirable oscillations of other components or groups of components. Apart from this, it is ineffective in the case of systems with varying resonance frequencies.

Measures for damping oscillations are widely known. In many instances, however, it is very difficult to dampen an oscillating structure or such damping is undesirable deisrable because it would impair the function of the oscillating system. Therefore, the measures taken to this end were frequently aimed at damping, by means of flexible resilient elements, a transfer of oscillations between components mechanically coupled to each other. However, in most cases such measures change merely the characteristic of the spurious forces, such as jerks or vibrations of adjacent machine components, without a significant reduction being obtained in the amount of energy transferred.

Oscillation quenching, also known as dynamic absorption, has proved the most effective method of preventing an undesirable transfer of oscillation forces of moved masses. This method ensures that the forces transferred to adjacent machine components are compensated at least in part and that in principle it is possible for oscillations to be quenched completely. The overwhelming majority of the known oscillation quenching arrangements relate to freely oscillating structures, whose oscillations are solely a function of the dimensions of the oscillating structure, such as overhead lines, for which an oscillation quenching arrangement is described in published West Germany Pat. application No. 2,056,164. Also known, however, are oscillation quenchers for constrained or forced oscillations, i.e., oscillations encountered in connection with masses capable of oscillating and which are moved by an extraneous — periodic or aperiodic — driving power. One of the most significant solutions in this field is what is known as the Taylor pendulum which for quenching constrained rotary oscillations on motors becomes effective over the full speed range. The Taylor pendulum is a rotating system with an eccentrically coupled centrifugal pendulum, whereby the excitation is diverted from the actual oscillating system to the coupled pendulum. See VDI-Zeitschrift, Nov. 5, 1938, pages 1297-1300. The disadvantages of this solution are that an additional oscillating mass is needed and that the pendulum can be used only for rotating mass systems.

Also see K. N. Tong's "Theory of Mechanical Vibrations" pages 138, through 146, J. Wiley & Sons, 1960, which discusses dynamic vibration absorbers consisting of a small vibratory system coupled to a machine, or other structure, to control vibrations. Such an absorber is designed so that when the machine is subject to a periodic oscillatory excitation the resulting vibration produces coupling forces that tend to cancel out the excitation forces.

West German Pat. No. 1,030,594 published on May 22, 1958, discloses a mechanical vibration system whose active mass carries at least one electromagnetic vibration generator joined to it by a coupling spring. The coupling spring and the total mass of the generator are dimensioned in such a manner that the natural frequency of the oscillation system equals, or almost equals the operation frequency.

Another prior art arrangement is shown in Hartmann's West German patent application No. 1,806,110 published on June 12, 1969 with priority of first filing in the United States on Nov. 2, 1967. This arrangement is a two mass vibration system consisting of a funnel, material being transported through the funnel to a material receiving transport tray for receiving a controlled quantity of material per unit of time such that the masses are flexibly coupled to form a correlated system having a single degree of freedom and whose mass natural frequency is nearly the same as the excitation frequency.

Also known, however, is an oscillation quencher which is used for linearly oscillating spring-mass systems. In this quencher which is known as the Frahm quencher (see Den Hartog, "Mechanical Oscillations," McGraw Hill 1934, p. 104) an oscillation system which is small in relation to the oscillating machine component is coupled to the main system whose natural frequency $\sqrt{c/m}$ is chosen so that it equals the oscillating or excitation force. However, this arrangement, too, requires an additional oscillating mass and has the disadvantage that oscillations can be quenched only in those cases where the frequency of the excitation force is essentially constant. Therefore, the use of the latter system is limited to apparatus which is directly coupled to electric synchronous motors or synchronous generators.

BRIEF SUMMARY OF THE INVENTION

An application filed concurrently with this application, by Frosch, Mansdoerfer and Scheuing Ser. No. 762,619 solves the problem of providing an arrangement by means of which the mass forces of an oscillating system can be quenched completely and very effectively, without using an additional mass, in that the drive of the arrangement for compensating the oscillations of the mass forces of a drive operated oscillating spring-mass main system by means of a spring-mass auxiliary system is itself designed as a spring-mass auxiliary system guided in the continuation of the path of movement of the spring-mass main system in such a manner that it oscillates at the same frequency as, but out of phase with, the spring-mass main system. Such an arrangement ensures that both in the case of linearly oscillating systems and in the case of constrained rotary oscillations, the oscillations encountered are quenched completely, irrespective of the frequency at which the oscillating structure is excited.

A prerequisite for using the invention in accord with the above application is that the difference between the mass of the oscillating element and that of the drive is not too great, because a substantial difference between the two masses would necessitate using correspondingly great additional masses to establish mass equality between the two systems. A disadvantage of this would be that a more powerful drive would have to be used to cope with the increased moment of inertia of the masses.

The present invention eliminates this disadvantage by using the aforesaid invention of Frosch, Mansdoerfer and Scheuing in providing an arrangement for compensating the oscillations of mass forces which permits total quenching of the oscillation forces encountered even in those cases where the masses of the oscillating spring-mass main system and the spring-mass auxiliary system formed by the drive differ or differ very significantly. In accordance with this invention, this is achieved in that the spring-mass auxiliary system and the spring-mass main system have the same natural frequency. With regard to dimensioning the oscillating element, the drive, and the spring elements for suspending these two masses, this invention contains the teaching that the ratio of the spring element rates and the ratio of the associated masses must be equivalent.

If the entire system is located in an environment which is undisturbed and free from vibrations, the mass inertial forces of the system are compensated in full by the arrangement in accordance with the invention, irrespective of whether the oscillations or positioning movements generated by the drive proceed periodically or aperiodically. If on the other hand spurious external forces are likely to occur, it is advisable in accordance with an advantageous embodiment of the invention to forcibly couple the spring-mass main system and the spring-mass auxiliary system. A preferred version of this forced coupling between the spring-mass main system and the spring-mass auxiliary system, if the masses of the two systems differ, takes the form of a differential lever.

DESCRIPTION OF THE DRAWINGS

The invention will be described below by means of drawings with reference to the art.

FIG. 1 is a schematic representation of the guide and the drive of a magnetic head carried arm for a magnetic disk storage, without oscillation quenching.

FIG. 2 is a representation in accordance with FIG. 1, in which the mass forces are quenched completely.

FIGS. 3 and 4 are mechanical models associated with FIGS. 1 and 2 and showing the forces of the oscillating systems.

DETAILED DESCRIPTION OF THE PREFERRED EMBODIMENTS

Figure 5:
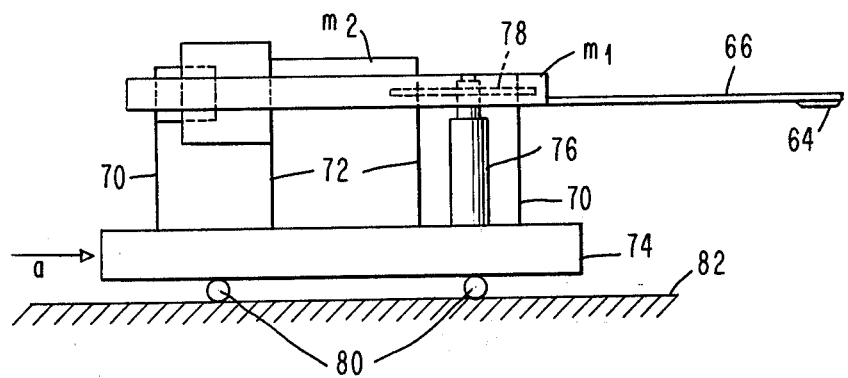
FIGS. 5 and 6 are lateral and plan views of an arrangement in which the two oscillating systems according to FIG. 2 are forcibly coupled by means of a differential lever.

FIG. 1 shows a continually rotating magnetic storage disk pack 10 driven by a disk pack drive motor 12. A magnetic head 14 for recording and scanning data is supported on an access control arrangement 18 by means of a head carrier arm 16. The essential components of the access control arrangement 18 are a platform carrier 20 and a platform 22, a carrier arm frame 24 being supported on platform 22 by means of leaf springs 26 to allow a certain degree of horizontal mobility. The platform carrier 20 is vertically adjustable, as schematically represented by means of rollers 28 and a guide surface 30 and as marked by double arrow 32, whereas platform 22 with the carrier arm frame 24 is horizontally movable in relation to platform carrier 20, as marked by rollers 34 between platform carrier 20 and platform 22, as well as by double arrow 36.

For recording data on one of the disks of the magnetic storage disk pack 10 or for scanning recorded data, platform carrier 20 is initially adjusted in one of the directions marked by double arrow 32 in such a manner that magnetic head 14 is aligned to the surface of the selected storage disk. Subsequently, the drive 37 is shown as a fluid operated cylinder in FIG. 1 adjusts platform 22 in relation to platform carrier 20, in order to align magnetic head 14 to the selected track on the storage disk in the direction of double arrow 36.

As data are recorded or scanned, the accurate radial alignment of magnetic head 14 to the selected track on the magnetic disk is continually monitored. The means used for this purpose are not shown in the drawing. If the difference between the actual and the nominal position of magnetic head 14 exceeds a particular value, following is effected by means of the carrier arm frame 24 with head carrier arm 16 and magnetic head 14 as a function of an automatic control system. For this purpose, a voice coil drive 40 is arranged on platform 22 between a frame part 38 of platform 22 and the carrier arm frame 24.

Accurate following over short distances necessitates that platform 22 as a reference system is at rest during the recording or scanning steps. Even when spurious influences effective from the outside are eliminated, this prerequisite cannot be met in full for the system shown in FIG. 1, since the reaction forces which are transferred to platform 22 via voice coil drive 40 in the course of the following motions of carrier arm frame 24 act as spurious forces on the system. Although in the arrangement shown this undesirable effect can be reduced by dimensioning the moved mass as small as possible, it cannot be eliminated completely.

The shortcoming of the arrangement of FIG. 1 is eliminated in the arrangement of FIG. 2. The typical arrangement and the design of the platform carrier and the platform with the carrier arm frame are the same as in the example of FIG. 1, so that all those parts having the same design and performing the same functions are marked by the same reference numbers as in FIG. 1. In contrast to the design described above, the voice coil motor designated as 50 in FIG. 2 is not rigidly fixed to frame part 38 of platform 22 but — similar to the carrier arm frame 24 — is flexibly supported on platform 22 by means of leaf springs 52, so that both the carrier arm frame 24 and the voice coil motor 50 are arranged in such a manner that they oscillate essentially linearly in relation to platform 22 in the direction of double arrow 36. As the following stroke for the recording tracks on the storage disk is only very short, the following motions generated under the influence of the voice coil motor 40 are practically linear.

The two oscillating systems in accordance with FIG. 2, namely the carrier arm frame 24 with the leaf springs 26 and the voice coil motor 50 with the leaf springs 52, are designed in such a manner that the mass of the voice coil motor 50 moves along the continuation of the path of movement of the carrier arm frame 24. When the voice coil motor 50 is switched on, the two masses perform phase opposed oscillation movements of the same frequency, whereby the moments of inertia of the mass of the carrier arm frame 24 are not transferred to platform 22 in full but are compensated in part by the following motions of the voice coil motor 50 which are carried out in the opposite direction.

In comparison with this, the mass moments of inertia encountered could be compensated in full by dimensioning the masses and the spring elements of the two oscillation systems identically. In the present case this would entail extraordinary disadvantages, since in order to ensure a high degree of sensitivity of the following arrangement, the oscillation system made up of the carrier arm frame 24 with the head carrier arm 16 and the magnetic head 14 as well as the leaf springs 26 must have a low inertia and thus a very small mass. On the other hand, the drive, in the present example the voice coil motor 50, necessitates a certain mass to produce the positioning forces required, so that the mass of the drive is essentially greater than that of the carrier arm frame arrangement. To ensure that the masses of the two oscillation systems concur, the carrier arm frame arrangement would have to have a mass which is a multiple of that actually required, so that the following system for the magnetic head would become extremely cumbersome and thus useless.

If in contrast with this, the two oscillation systems made up of the masses of parts 14, 16, 24, 26 and 50, 52 are designed to have the same natural frequency, the inertial forces of the two oscillation systems are compensated in full, without reaction forces being tranferred to platform 22.

FIGS. 3 and 4, corresponding to the systems of FIG. 1. (without oscillation quenching) and to FIG. 2 (with oscillation quenching), show how the oscillations encountered are quenched completely, while the natural frequencies of the systems oscillating phase opposed to each other are the same.

For the model of FIG. 3, which corresponds to the arrangement of FIG. 1, the equation of motion is as follows:

$$-F_M(t) = m_1 \Omega^2 x_1 + c_1 x_1$$
$$\frac{-F_M(t)}{c_1 x_1} = \frac{m_1 \Omega^2 x_1}{c_1 x_1} + 1$$

by setting $c_1/m_1 = \omega_1^2$ and after simple transformation, the force transferred to platform 22 by the spring with the characteristic $c_1$ is $$F_{F1} = c_1 x_1 = -\frac{F_{MO}}{\frac{\Omega^2}{\omega_1^2} + 1} \cos \Omega t$$

where
$$F_M(t) = F_{MO} \cos \Omega t.$$

For the system with two moved masses $m_1$ and $m_2$, as shown in FIG. 4 and corresponding to the arrangement of FIG. 2, the equations of motion for the two masses are:

$$F_M(t) = -m_2 \Omega^2 x_2 - c_2 x_2$$
and
$$-F_M(t) = m_1 \Omega^2 x_1 + c_1 x_1.$$

In this case the forces transferred by the springs to platform 22 are $$F_{F2} = \frac{F_{MO}}{\frac{\Omega^2}{\omega_2^2} + 1} \cos \Omega t$$

and

-continued
$$F_{F1} = \frac{-F_{MO}}{\frac{\Omega^2}{\omega_1^2} + 1} \cos \Omega t.$$

The resulting force $$F_a = F_{F1} + F_{F2} = F_{MO} \left( \frac{-1}{\Omega^2/\omega_1^2 + 1} + \frac{1}{\Omega^2/\omega_2^2 + 1} \right) \cos \Omega t$$

thus becomes zero if $\omega_1 = \omega_2$, i.e., if the two spring-mass systems have the same natural frequency, i.e., $c_1/c_2 = m_1/m_2$.

In the arrangement of FIG. 2 the voice coil motor ensures that the movements of the oscillation systems proceed invariably phase opposed to each other, since the magnetic field between the energizing coil and the field coil of the voice coil motor exerts the same force on the two masses. Furthermore, it is assumed that the environment of the whole system is at a total rest, i.e., that no spurious forces from the outside act on the platform. If such spurious forces cannot be discounted, for example, when platform 36 is horizontally adjusted, it is recommended that the two oscillation systems be forcibly coupled to each other, the forced coupling ensuring that even when external spurious forces become effective the mass systems move in opposite directions rather than in the same direction. If the oscillation systems have different masses, which generally is the rule, then the forced coupling may take the form of a differential lever, as shown in FIGS. 5 and 6.

The design of the arrangement in FIG. 5 is similar to that in FIG. 2 in that two spring-mass systems can be moved phase opposed to each other along a common path of movement by means of a voice coil motor. As shown in FIG. 5, the head carrier arm 66 with the magnetic head 64 is rigidly connected to the energizing coil 61 of the voice coil motor 60 by means of a rectangular frame 68. These parts, designated as mass $m_1$ in FIG. 5, are supported on platform 74 by means of leaf springs 70. The second mass, designated as $m_2$ in FIG. 5, is made up of the field coil 62 of voice coil motor 60 and is guided on platform 74 by means of a pair of identical leaf springs 72. In accordance with the preceding description, the spring elements 70 and 72 are dimensioned in relation to the masses $m_1$ and $m_2$ in such a manner that the two spring-mass systems have the same natural frequency.

Figure 6:
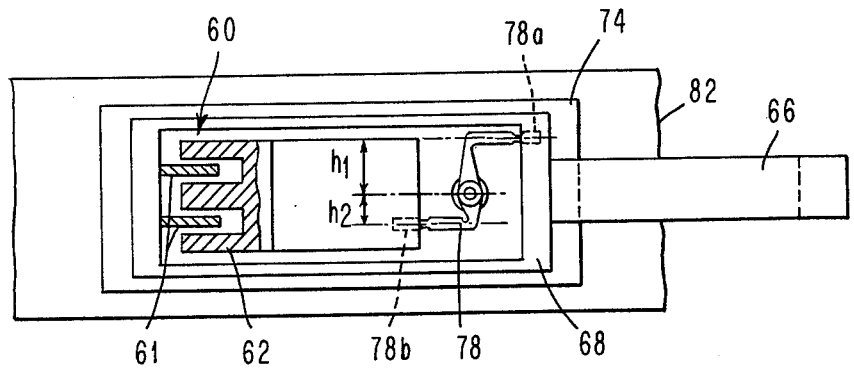

A differential lever 78 which, as shown in FIG. 6, is fixed with one end 78a to mass $m_1$ and with the other 78b to mass $m_2$ is pivotably mounted on a bolt 76 vertically fixed to platform 74. As shown in FIG. 6, differential lever 78 has different lever arms designated as $h_1$ and $h_2$, whereby lever arm $h_1$ is associated with mass $m_1$ and lever arm $h_2$ with mass $m_2$.

In accordance with FIG. 5, platform 74 is movable on a stationary surface 82 by means of rollers 80. It is assumed that as a result of an external spurious force exerted on platform 74 an acceleration directed to the right becomes effective, as represented by the arrow. The inertial forces occurring on masses $m_1$ and $m_2$ as a result of this acceleration $a$ of platform 74 are compensated in full in relation to each other in that their moments on differential lever 78 amount to the moment sum zero. The differential lever arms $h_1$ and $h_2$ required are obtained in accordance with the relation $$m_1 h_1 a = m_2 h_2 a$$

to $$h_1/h_2 = m_2/m_1$$

Thus the lever arm ratio of differential lever 78 is to be chosen inversely proportional to the ratio of the associated masses of the two spring-mass systems to ensure that the inertial forces are compensated in full even when external spurious forces are encountered.

In accordance with FIG. 6, differential lever 78 has spring joints, thus avoiding backlash or friction in the joints. However, the forced coupling employed for the two spring-mass systems may also take the form of a fluid operated coupling.

A differential coupling in accordance with FIGS. 5 and 6 serves not only to compensate the moments of inertia of the two spring-mass systems when spurious forces are exerted on the platform but also to ensure that when voice coil motor 60 is switched off during adjustment of platform 74, the head carrier arm 66 with the magnetic head 64 accurately follows the positioning motion of platform 74, without the spring-mass system oscillating beyond the nominal position of the magnetic head 64.

What is claimed is:

1. In an arrangement for compensating oscillations of the mass forces of a driven oscillating spring-mass main system by means of a spring-mass auxiliary system operably guided in a continuation of the same movement path as said main system in a manner that it oscillates at the same frequency as, but out of phase with, said main system, in which said auxiliary system has the same natural frequency as said main system, the improvement comprising a differential lever system for coupling the two said systems to compensate for external spurious forces.

2. Apparatus as claimed in claim 1 wherein said differential lever system is coupled to the main system and to the auxiliary system by yieldable joining means.

3. Apparatus as claimed in claim 2 wherein said yieldable joining means comprises spring means.

4. Apparatus as claimed in claim 2 wherein said yieldable joining means comprises as fluid coupling.

5. Apparatus as claimed in claim 4 wherein said fluid coupling comprises a pneumatic dashpot.

6. Apparatus as claimed in claim 4 wherein said fluid coupling comprises a hydraulic coupling.

* * * * *